June 30, 1964  W. L. TENNEY  3,139,075
CRANKCASE SCAVENGED, TWO-CYCLE OPPOSED PISTON ENGINE
Filed Dec. 3, 1962  5 Sheets-Sheet 1

INVENTOR.
WILLIAM L. TENNEY
BY
Dugger Braddock Johnson & Westman
ATTORNEYS

INVENTOR.
WILLIAM L. TENNEY

June 30, 1964     W. L. TENNEY     3,139,075
CRANKCASE SCAVENGED, TWO-CYCLE OPPOSED PISTON ENGINE
Filed Dec. 3, 1962     5 Sheets-Sheet 5

INVENTOR.
WILLIAM L. TENNEY
BY
Dugger Braddock Johnson & Westman
ATTORNEYS

United States Patent Office 3,139,075
Patented June 30, 1964

3,139,075
CRANKCASE SCAVENGED, TWO-CYCLE
OPPOSED PISTON ENGINE
William L. Tenney, Crystal Bay, Minn.
Filed Dec. 3, 1962, Ser. No. 241,942
6 Claims. (Cl. 123—51)

It is an object of this invention to provide improved crankcase scavenged, two-cycle, opposed piston engines. It is another object of this invention to provide an improved engine of the aforesaid type wherein cylinders are arranged contiguous in pairs and a crankcase means is provided at the adjacent ends of the cylinders, the crankcase means at one end of the contiguous cylinders being such that with the cooperating pistons it may be used for providing compressed charge for the scavenging flow in one direction in one of the cylinders, the crankcase means at the other end of the contiguous cylinders being likewise such that, with the cooperating pistons, it may be used for providing a scavenging flow in the opposite direction in the other cylinder.

It is a further object of the invention to provide opposed piston, uniflow scavenged, crankcase scavenged engines wherein the scavenging is obtained without long manifolding extending between opposite ends of the engine.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which FIGURE 1 is a longitudinal sectional view illustrating one exemplary form of two-cylinder engine embodying the invention;

Throughout the drawings, corresponding numerals refer to the same parts.

Figure 1:
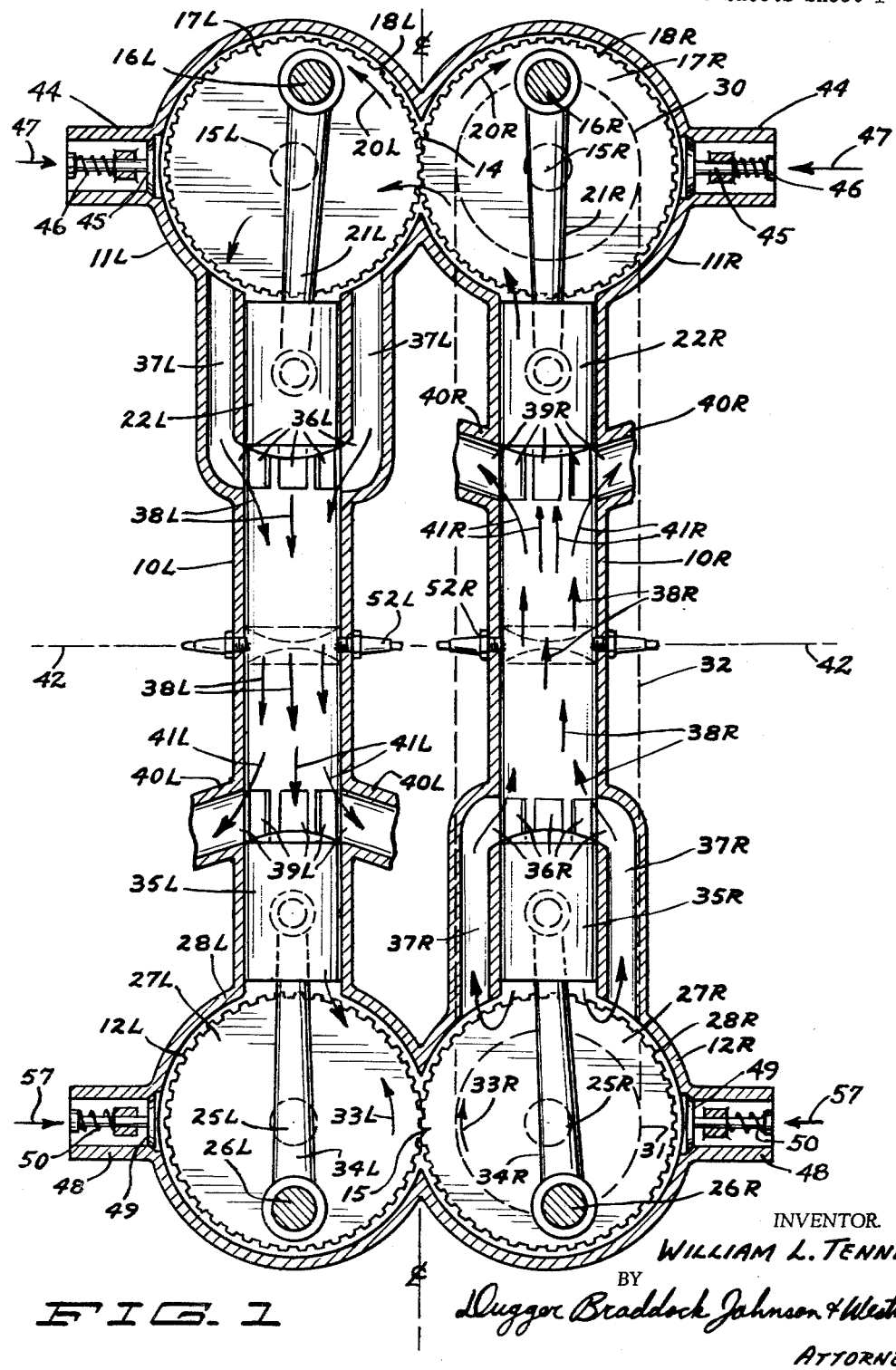

Referring to the drawings, in FIGURE 1 there is illustrated one exemplary form of engine embodying the invention. This engine utilizes two cylinders with a crankcase and crankshaft at each end of each cylinder. The crankshafts are set parallel and are geared to operate in unison, and the crankcases are interconnected.

It is to be understood that larger engines embodying the engine may be made, having additional pairs of cylinders, such as a four cylinders, six cylinder, and larger engines. The larger engines simply utilize additional pairs of cylinders with their pistons and crankcases duplicating those shown in FIGURE 1, and their crankshafts are connected, according to the layout of the cylinders.

In FIGURE 1, there are illustrated a pair of adjacent parallel-axis cylinders 10R and 10L. Each of these cylinders has a crankcase at each end. Thus, cylinder 10R has a crankcase 11R at its upper end as shown in FIGURE 1 and a crankcase 12R at its lower end. The cylinder 10L has the crankcase 11L at its upper end; the crankcase 12L at its lower end.

The two crankcases 11R and 11L are interconnected at the center line CL, thus providing communicating passage 14 between them, and in effect, forming a common crankcase. Similarly, the two crankcases 12R and 12L are interconnected at the center line, in effect, forming another common crankcase CL, thus providing communicating passage 15 between them.

In crankcase 11R there is a crankshaft 15R having a crankpin 16R thereon. In crankcase 11L there is a crankshaft 15L having a crankpin 16L thereon. The crankshaft may be constructed in any way desired. In this instance, the construction is accomplished by providing spaced crankdiscs, of which disc 17R is shown on the crankshaft 15R, it being understood that there may be a similar crankdisc at the forward side of the engine, with the crankpin 16R connecting them, or a single disc with an overhanging crankpin can be used. Similarly, in crankcase 11L the crankshaft 15L is provided with a crankdisc 17L, and there may be another crankdisc on the forward side, not illustrated, which is connected to crankdisc 17L by the crankpin 16L, or a single disc may be used with an overhanging crankpin.

The crankshafts 15R and 15L are arranged to turn at the same r.p.m., in either the same or opposite directions and in selected phase relation. This is conveniently accomplished by providing gear teeth on the periphery of one crankdisc in each crankcase, or by any other suitable mechanical means, such as toothed belt, chain and sprocket, etc. As illustrated, the crankdisc 17R is provided with gear teeth at 18R which mesh with similar gear teeth at 18L on the crankdisc 17L. Thus, assuming the crankdisc 17R turns clockwise, in the direction of arrow 20R, through cooperation of its gear teeth 18R with the gear teeth 18L, this will cause the crankdisc 17L to turn counterclockwise, in the direction of arrow 20L.

The crankpin 16R is connected by a connecting rod 21R to piston 22R. Similarly, the crankpin 16L is connected by the connecting rod 21L to the piston 22L. Pistons 22R and 22L will accordingly move up and down in their respective cylinders 10R and 10L, as shown in FIGURE 1. It is noted that the crankpin 16R is advanced about 10° of rotation ahead of crankpin 16L. The amount of angularity advance if any, may be selected as desired, to suit the needs of the particular engine design.

If desired, a single crankshaft at each end of the cylinders may be used to operate the side-by-side pistons at such end of the cylinders, as is well known in U-cylinder engines.

The lower ends of the cylinders 10R and 10L are also provided with crankdiscs, cranks, connecting rods and pistons in an exactly similar manner. Thus, in the crankcase 12R there is provided a crankshaft 25R and in the crankcase 12L there is provided a crankshaft 25L. Crankshaft 25R carries crankdiscs of which the disc 27R is shown and another similar crankdisc, not illustrated, may be forwardly disposed. When two crankdiscs are used, they are connected together by the crankpin 26R. Similarly, crankshaft 25L has a crankdisc 27L and may have a similarly forwardly disposed crankdisc to which it may be connected by the crankpin 26L. As already mentioned, a single crankdisc form of construction with an overhanging crankpin may be used, if desired. Again, the crankdisc 27R and 27L are each provided with gear teeth as at 28R and 28L and these gear teeth mesh with similar gear teeth 28L on the crankdisc 27L, so as to cause the crankshafts to turn in synchronism, or other means may be used for connecting them, the only requirement being that they should turn at the same r.p.m., in the same or opposite directions and in selected phase relation. Again in this instance, crankpin 26L is advanced about 10° ahead of crankpin 26R.

Upon the crankpin 26R there is mounted a connecting rod 34R which is connected to the piston 35R and similarly upon the crankpin 26L there is mounted a connecting rod 34L which is connected to the piston 35L.

On one of the crankshafts 15R or 15L (here illustrated as crankshaft 15R) and outside of the crankcase there is provided a gear sprocket or other suitable timing and power transmitting sprocket 30. On the crankshaft at the opposite end of the same cylinder (here illustrated as crankshaft 25R) and outside of the crankcase 12R there is similarly provided another timing and power transmitting sprocket 31 of the same size as at 30. These sprockets 30 and 31 are connected together by gear chain 32. Any other suitable mechanical connection between shaft 15R and 25R, as for example a chain of gears (which may lead to the power output) or a toothed belt pulley, or bevel gears and shaft, may be used. By these expedients, the lower crankshafts 25R (and 25L) are kept in phase with the crankshafts 15R (and 15L) at the other end of the engine.

So far as this engine is concerned, it makes little or no difference whether the crankshafts are rotated in one direction or the other, so long as the motions of the pistons in the pairs of cylinders are simultaneously towards and simultaneously away from each other, with appropriate lead (if any is used) for pistons 22R and 35R and between 22L and 35L.

By virtue of the construction described, the pistons 22R and 35R are cooperating pistons and pistons 22L and 35L are cooperating pistons operating, respectively, in cylinders 10R and 10L. Pistons 22R and 35R (and pistons 22L and 35L) move toward each other simultaneously and then simultaneously away from each other except for lead (where used). The timing of the two pistons in each cylinder, with reference to the valve porting of the cylinder, does not need to be precisely as shown. Stated another way, the timing of the opening and closing of the exhaust ports and the opening and closing of the intake ports which is presently to be described, can be varied as is well known in the engine art.

In cylinder 10R there are provided a plurality of intake ports 36R. For simplicity of illustration, these intake ports are here illustrated as generally rectangular openings spaced around the cylinder wall, and these communicate with intake transfer passages and manifold 37R—37R. A wide variety of port shapes and directions and combinations of port shapes and directions are available in the art and may be used as desired. The transfer passages extend down into the crankcase 12R and through it to the crankcase 12L. When the two pistons 35R and 35L move downwardly in the cylinders 10R and 10L, respectively, as shown in FIGURE 1, they will compress the gases in the connected crankcases 12R and 12L. When the piston 35R reaches the upper boundary of the ports 36R, the thus compressed gases will be available to flow into the cylinder 10R in the direction of the arrows 38R.

The corresponding intake ports 36L for cylinder 10L are in the upper end of cylinder 10L as shown in FIGURE 1; that is to say in the end of the cylinder 10L which is oppositely disposed as compared to cylinder 10R. These intake ports 36L likewise communicate with the transfer passages 37L—37L which lead upwardly into crankcase 11L and through it into 11R. Accordingly, when the pistons 22R and 22L move upwardly in the cylinders 10R and 10L respectively, as shown in FIGURE 1, they will compress the gases within the combined crankcases 11R and 11L and when the piston 22L reaches the lower edge of the ports 36L, as shown in FIGURE 1, these compressed gases will be available to flow through the transfer passageways 37L and into the cylinder 10L. The flow of gases from the transfer passageways 37L and through the ports 36L into cylinder 10L is illustrated by the arrows 38L.

It will thus be seen that cylinder 10R has an inflow of scavenging gas in an upwards direction as shown in FIGURE 1 and cylinder 10L has an inflow of scavenging gas in a downward direction as shown in FIGURE 1. These flows are each predominantly a uni-directional flow from one end of the cylinder to the other end and these predominantly uni-flow scavenging flows are in opposite directions in the two cylinders.

The exhaust ports of the two cylinders are similar but are arranged at opposite ends of the cylinders from their respective inlet ports. Thus, the cylinder 10R has a plurality of exhaust ports 39R spaced around the walls of the cylinder and communicating with an exhaust manifold 40R. Similarly, cylinder 10L has a plurality of exhaust ports 39L spaced around the walls of the cylinder and communicating with the exhaust manifold 40L. These exhaust ports are so positioned as to be uncovered respectively by piston 39R on its upward stroke and piston 35L on its downward stroke, and they will remain uncovered until the pistons 39R and 39L respectively reach their extreme positions and until they again cover their respective ports. Accordingly, the flow of gases in cylinder 10R, in the direction of arrows 38R (upward direction through cylinder 10R as shown in FIGURE 1) is outward through the exhaust ports 39R, as shown by the arrows 41R, and similarly the flow of gases in cylinder 10L in the direction of arrows 38L (downward through cylinder 10L as shown in FIGURE 1) is outward through the exhaust ports 39L, as shown by the arrows 41L.

Considered from the standpoint of direction, the scavenging flow in cylinder 10R is opposite to that of cylinder 10L, i.e. the flow of cylinder 10R is upward and the flow of cylinder 10L is downward, as shown in FIGURE 1. These scavenging flows are predominantly in the same direction for a particular cylinder. Thus, the flow in cylinder 10R is always in an upward (as shown in FIGURE 1) and the flow in cylinder 10L is always in the downward (as shown in FIGURE 1). This is called a "uniflow scavenging flow."

By virtue of the interconnection of the crankcase 11R and 11L at port 14, the cooperating crankcases 11R and 11L and the pistons 22R and 22L associated with these crankcases cooperatively produce the compressed scavenging gases which flow through cylinder 10L. Similarly, by virtue of the interconnection of crankcases 12R and 12L at port 15, the cooperating crankcases 12R and 12L and their associated pistons 35R and 35L cooperatively produce the compressed scavenging gases which flow through cylinder 10R.

The cylinders 10R and 10L have been illustrated as straight and parallel. It will be appreciated that the cylinders may be bent along the midline 42—42, along the axial length of the cylinders. Thus, the upper ends of the cylinder 10R and 10L may be parallel in another plane, these two planes intersecting at line 42—42. The amount of angularity between the two planes can be adjusted to suit, although excessive angularity may not be desirable because as the angularity increases to, for example, approaching 60°–90° included angle, the flow of scavenging gases in passing through the midsection (waist) of the cylinders at line 42—42, will change its direction and its desired flow as a unified core of scavenging gases will be interrupted due to turbulence at the bend. Therefore, for best results, it is preferred to have the cylinder straight and parallel or at least not to have an excessive angularity between the planes of the upper ends of the cylinders and the lower ends of the cylinders.

In FIGURE 1 intake ports 44 are provided for crankcases 11R and 11L, these ports being equipped with a poppet-type check valve 45 that is normally held closed by the spring 46. Air, or a carburetted mixture of air and fuel is supplied as shown by the arrows 47. This inflow, which goes into the connecting interiors of the crankcases 11R–11L, is then later on compressed by the action of the pistons 22R—22L, thereby providing the compressed gases which, as scavenging gases, flow through the transfer ports 37L—37L as previously mentioned.

Similar intakes 48 are provided for the combined crankcases 12R and 12L. These are likewise provided with poppet-type check valves 49 normally held closed by the springs 50. The inflow of air or a carburetted mixture of air and fuel is via arrows 57 into the connecting interiors of the associated crankcases 12R and 12L. It is this flow via arrows 57 into the crankcases 12L—12R, which is later on compressed by action of pistons 35L—35R and is introduced via transfer ports 37R into the cylinder 10R, as previously mentioned.

It will be appreciated that by combining the crankcases of the adjacent cylinders, the compression of gases in the combined crankcases can be used as a whole for scavenging one cylinder, and by orienting the two cylinders of the engine so that the scavenging flows therethrough are in opposite directions in respect to each other, both cylinders are thus effectively serviced. This is accomplished without external manifolding between opposite ends of the cylinders.

At the midline 42—42 of the cylinder, there are provided spark plugs 52R and 52L when the engine is of the ignition type, and in such event, the induction flows at arrows 47 and 51 and is a carburetted mixture of fuel and air. When the engine is of the diesel type, air is introduced at arrows 47 and 51, and will constitute the scavenging flow, and in such case the spark plugs 52R—52L are replaced by fuel injection nozzles suitable for diesel-type engines and fuel is then introduced at an appropriate time in respect to the stroke of the pistons in the cylinders, as is well known.

It will be appreciated that the timing of the openings of the intake and exhaust ports, as for example ports 36R and 39R respectively of cylinder 10R, and the corresponding ports of cylinder 10L, will depend upon the positioning of these ports along the length of the cylinder in respect to the ends of the pistons. This timing can be arranged as desired, so as to provide, for example, a certain lead time in the opening of the exhaust port as compared to the opening of the intake port, and for other purposes as is well known. The timing is selected as desired. In the illustrated embodiment, cranks 26R and 16L lead cranks 16R and 26L respectively by about 10°, a normal design amount. Variations in port timing can, of course, also be achieved by changing the port heights and this can be used either alone or in combination with crank phasing to achieve the desired port timing.

Figure 2:
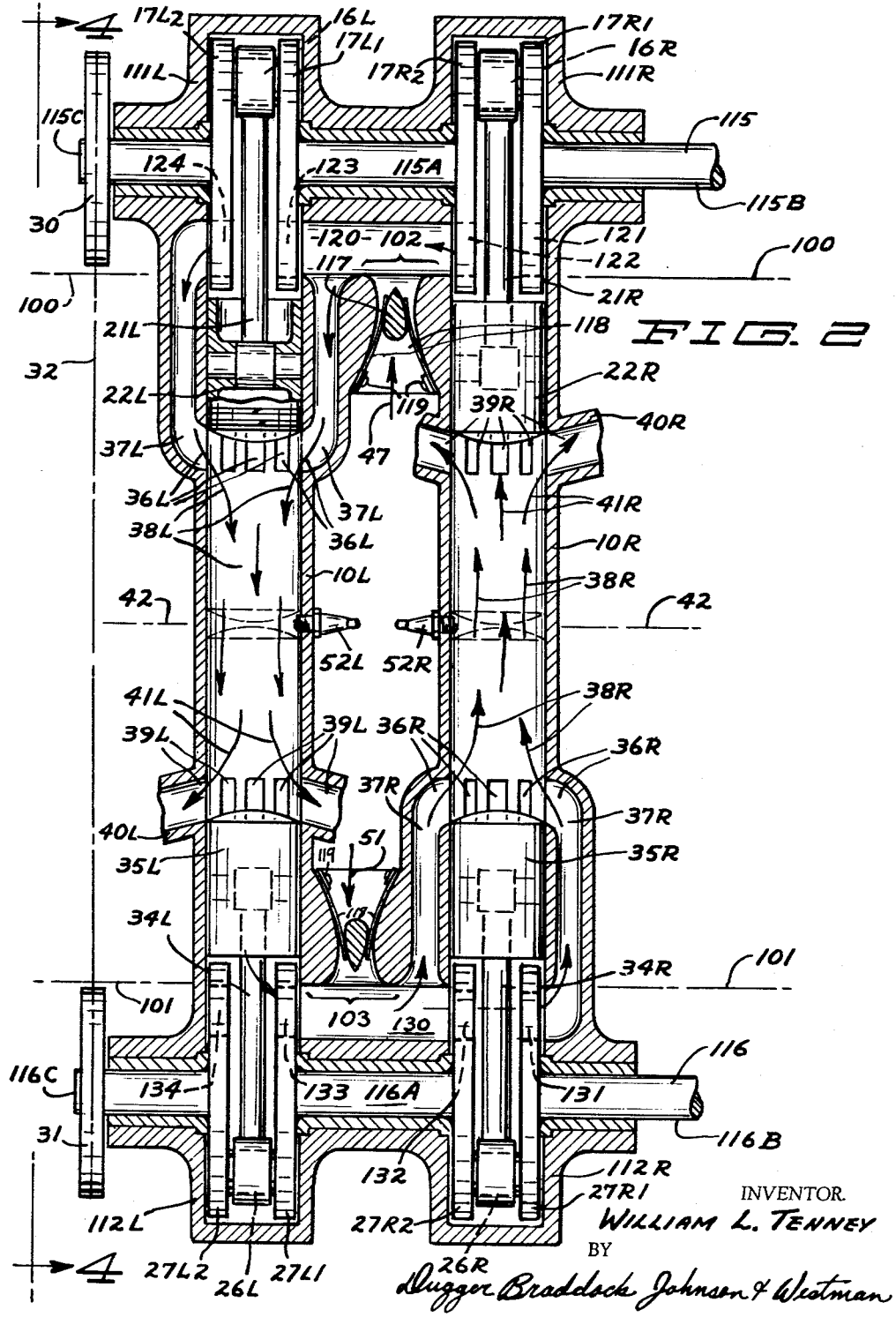
FIGURE 2 is a longitudinal sectional view illustrating another exemplary form of two-cylinder engine embodying the invention.

In FIGURE 1 the engine is provided with pairs of crankshafts, as for example the pair 15R–15L at the upper end of the engine as shown in FIGURE 1, and the pair 25R–25L as shown at the lower end of the engine. These pairs of crankshafts are arranged to turn in unison, as previously described. The invention can be embodied with equal facility in an engine utilizing only one crankshaft at one end serving both of the cooperating cylinders at that end and another crankshaft at the opposite end serving both of the cooperating cylinders at said opposite end. Such a construction is shown in FIGURE 2. It will be observed in FIGURE 2 that the construction of the cylinders 10R and 10L (or at least that portion appearing between the lines 100—100 and 101—101 are identical with those shown in FIGURE 1, with the exception of the re-location of the induction port 102 (which replaces the induction ports 44 of FIGURE 1 for the upper crankcases), and an identical form of induction port shown over the bracket 103 (to replace induction ports 48 of FIGURE 1). Therefore, the detailed description of these portions of cylinders 10R and 10L need not be repeated.

In FIGURE 2, the crankcases 111R and 111L replace the crankcases 11R and 11L respectively and it will be noted whereas crankcases 11R and 11L are in the same plane, the crankcases 111R and 111L are in parallel spaced planes. These crankcases 111R and 111L are shaped so as closely to confine the crankdiscs 17R1 and 17R2 (which correspond to the crankdiscs 17R and its companion disc of crankcase 11R) and crankcase 111L is shaped so as to closely confine for crankdiscs 17L1 and 17L2 (which correspond to crankdisc 17L and its companion disc in crankcase 11L of FIGURE 1). In the construction shown in FIGURE 2 there is one crankshaft 115 which mounts all of the crankdiscs and this crankshaft has a common connecting portion 115A, which is the portion of the crankshaft between the two crankcases. The output end of the crankshaft is at 115B and the timing sprocket 30 is at the opposite end 115C of the crankshaft.

Similarly, crankcase 112R closely provides space for the crankdiscs 27R1 and 27R2 (which correspond to disc 27R and its companion disc in crankcase 12R of FIGURE 1). Likewise, crankcase 112L of FIGURE 2 provides the space for the crankdiscs 27L1 and 27L2 (which correspond to crankdisc 27L and its companion disc in crankcase 12L). Again, the two crankcases 112R and 112L have a common crankshaft 116 which has an output end 116B, a connecting portion 116A and an end 116C upon which the lower timing sprocket 31 is mounted.

The two induction ports 102 and 103 are identical and each provides a curved passage of rectangular cross-section having a central land as at 117. This land provides a rest for the leaf-valves 118—118 which are fastened by suitable attachment plates and screws 119—119. The leaf valves will spring away from the land 117 whenever there is a negative pressure within the combined crankcases 111R–111L. The inner end of the induction port 102 enters passageway 120 which connects the two crankcases 111R and 111L. It is also noted that the crankdiscs 17R1, 17R2, 17L1 and 17L2 are all provided with suitable apertures as at 121, 122, 123 and 124. These apertures have a sufficient arcuate length, and they are appropriately located, so that a free flow of gases may take place transversely, in a direction parallel to line 100—100, through the combined crankcases which is to say through passage 120 at all times when the flow is needed.

During the time that a negative pressure exists inside the combined crankcases, air, or a carburetted mixture of fuel and air, depending upon the type of engine, will be drawn through the induction port 102 and into the passage 120 and hence through the apertures 122 and 123 and into the interiors of the crankcases, above the pistons 22R and 22L. Then during the compression stroke (in respect to the crankcases) as the pistons 22R and 22L are rising within their respective cylinders, the inducted charge within the combined crankcases and the connecting passageways is compressed and when the piston 22L reaches the position at which it begins to uncover (the lower edge of) the port 36L in cylinder 10L, the compressed charge within the crankcases will be permitted to flow through the transfer passageways 37L—37L. This flow is in the direction of arrows 38L into the cylinder 10L.

This flow down through the cylinder 10L will continue and will scavenge waste gases out of the cylinder 10L through the exhaust port 39L, where the piston 35L, in properly timed relation, has uncovered the exhaust ports. The outward flow is designated by the arrows 41L.

The induction port 103 for the combined cylinders 112R and 112L is precisely the same as at 102 and it permits the induction of air, or a carburetted mixture of air and fuel into the passageway 130, which connects the combined crankcases 112R and 112L. In these crankcases, the crankdiscs are likewise ported as at 131–134, and therefore the induced charge is freely distributed within the crankcases. As the pistons 35R and 35L move downwardly within the cylinders 10R and 10L, respectively, this charge within the crankcases 112R and 112L is compressed and it is not until piston 35R begins to uncover the upper edges of the ports 36R that the charge will be permitted to flow through the transfer passageways 37R and through the ports 36R into the cylinder 10R. This flow is denoted by the arrows 38R. The flow is thence upward through the cylinder 10R and outward through the exhaust ports 39R, which are at an appropriate interval, uncovered by the piston 22R. The exhaust flow is denoted by arrows 41R.

It will be noted with reference to FIGURE 2 that the crankcases are fashioned so as neatly to contain the crankdiscs, and this is also true of the construction shown in FIGURE 1. The reason is that the clearance volume in the crankcase is, desirably, reduced to a minimum, so as to provide a maximum compression ratio within the crankcases.

In the engine shown in FIGURE 2, spark plugs 52R and 52L are used when the engine is of the type having a carburetted fuel-air mixture introduced from the induction ports 102–103. If the engine is of the diesel type, these spark plugs are replaced by fuel injection nozzles, the injection of the fuel being by an appropriately timed fuel injection pump, or combined fuel-injection, spark ignition and other specialized designs may be used.

In the engine shown in FIGURE 2, as in respect to that shown in FIGURE 1, the timing of the intake and exhaust ports is by virtue of their positioning in the cylinder, with reference to the piston positions and, as in FIGURE 1, the cranks 16R and 26L are arranged to lead, by a small angle such as 10°, the related cranks 16L and 26R respectively. The timing of the exhaust and intake ports and also the crankshaft lead are selected as is expedient, according to good design.

It is not necessary, when utilizing the teaching of this invention, to have the bore of the cylinder the same at each end. In FIGURES 1 and 2, the bore of the cylinders is constant from one end to the other, and the pistons 22R and 35R, for example, are of the same size, as are the pistons 22L and 35L. However, in some situations, the bore at one end of the cylinder may be reduced, as compared with the bore at the other end of the cylinder. This is illustrated in the embodiment of the invention shown in FIGURE 3, which shows an engine that is in all respects the same as that shown in FIGURE 1, except for the reduction in the size of the cylinders at the exhaust end of each cylinder, and also a corresponding reduction of the stroke of the piston in the exhaust ends of the cylinders. Thus, in FIGURE 3, cylinder 210R, which corresponds to cylinder 10R has a lower portion which is identical up to the mid-line 250—250 to that shown in FIGURE 1. However, above the line 250—250, the cylinder 210R is of reduced diameter, and the piston 222R is smaller, as compared to the size which is used for the corresponding part in FIGURE 1. Likewise, the throw of the crankpin 216R (the radial distance of the pin 216R from the center of crankshaft 215R) is smaller than the corresponding dimension in FIGURE 1. Likewise, that portion of the cylinder 210L which is above the line 251—251 in FIGURE 3, corresponds exactly with the portion of the cylinder 10L of FIGURE 1, which is above the line 42—42, but the portion of the cylinder 210L which is below the line 251—251 is of proportionately reduced size, corresponding exactly to the upper portion of the cylinder 210R which has been referred to.

This construction can be conveniently attained by keeping the crankdiscs 217R and 217L of the same size, but the portion of the crankcase 211R, between the crankdiscs, is reduced since the throw of crankpin 216R is smaller. By shaping the crankcase appropriately, the amount of clearance volume is minimized.

Figure 3:
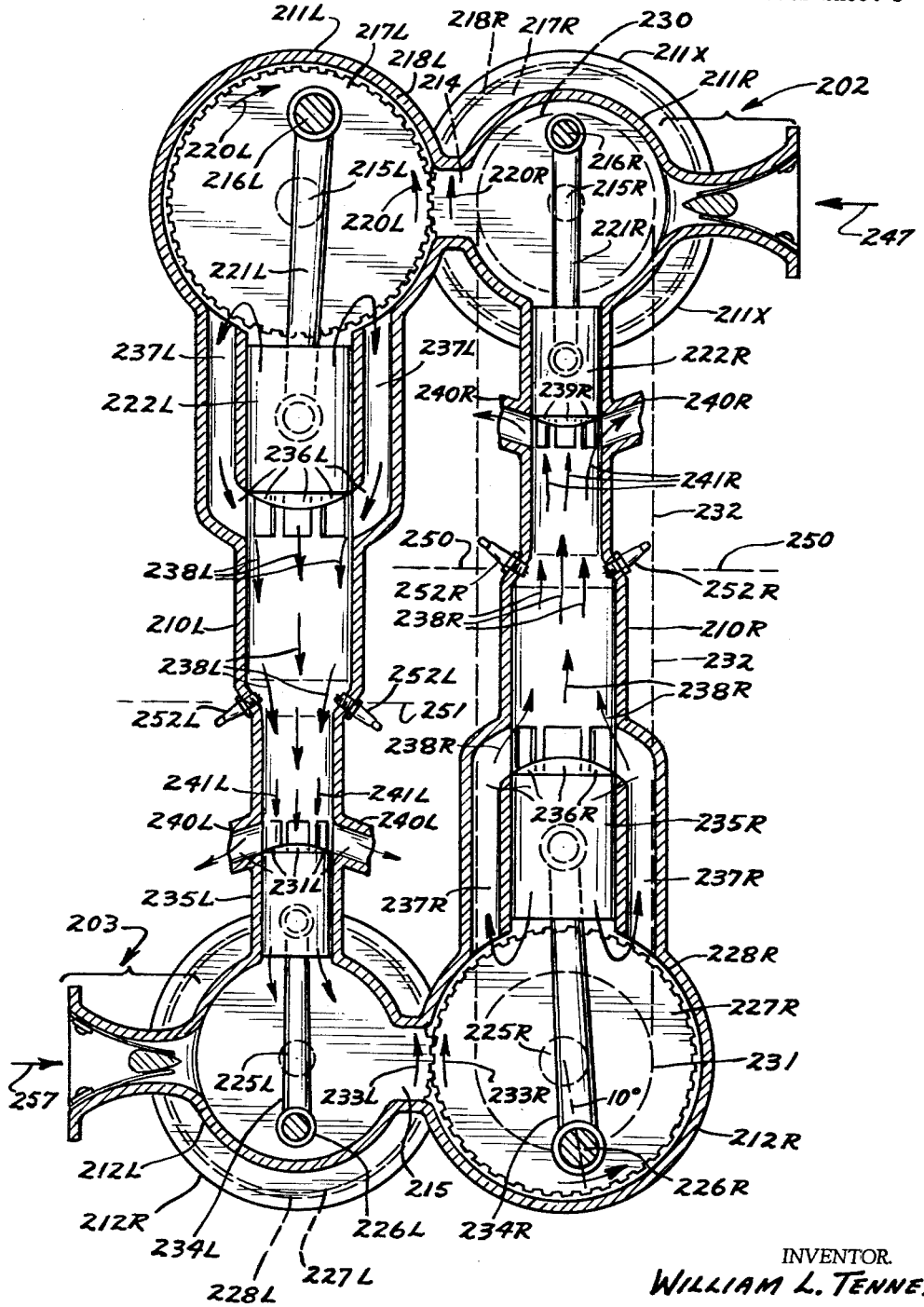
FIGURE 3 is a longitudinal sectional view illustrating a third exemplary form of two-cylinder engine embodying the invention.

Throughout FIGURE 3, the numbers for the various parts and arrows correspond to those given in FIGURE 1, except for the prefix numeral "2," thereby providing a "200" series of numerals for designating the parts.

In FIGURE 3, the induction ports 202 and 203 correspond respectively, and are of the same style as the induction ports 102 and 103 of FIGURE 2. The induction port 202 leads into the interior of the combined crankcases 211R—211L and the induction port 203 leads into the combined crankcases 212L—212R.

The functioning of the engine corresponds to that previously described with reference to FIGURE 1. The reduction in area of the exhaust ports 239R and 239L is not a significant disadvantage since it is feasible to utilize exhaust ports having a total area somewhat less than the intake ports for the same cylinder.

Figure 4:
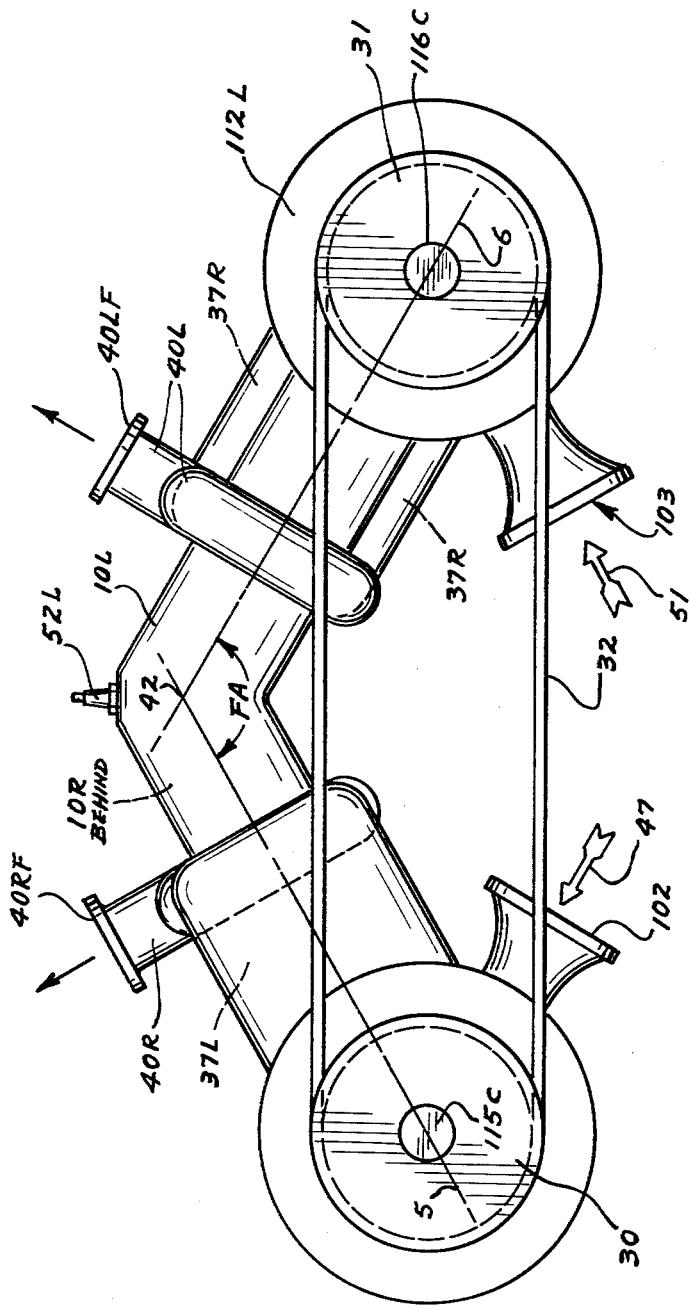
FIGURE 4 is a side elevational view illustrating a modified form of the invention.

Reference has already been made to the fact that the axis of the cylinders need not be in the same plane, but can be positioned in two planes which intersect along a line, such as line 42—42 of FIGURE 2. FIGURE 4 illustrates an engine which is thus "folded." In FIGURE 4, an engine is viewed from a direction such as from the left, in FIGURE 2. When viewed thus, one sees the ends 115C and 116C of the crankshaft, and the sprockets 30–31 mounted respectively on the crankshaft ends. One also sees the timing belt or chain 32. The cylinder nearest the viewer is cylinder 10L, and one sees the bulge at the base of the cylinder in which the transfer passages 37L are contained, whereas at the other end of the same cylinder, one sees the exhaust manifold 40L. In FIGURE 4, the exhaust manifold is shown in its complete form, encircling the cylinder and equipped with a bolting flange at 40L. The axis of that portion of cylinder 10L which is at the left in FIGURE 4, is along the line 5–42. These lines are situated in the planes of location for the axes of the two parallel cylinders. Thus, it will be understood that as viewed in FIGURE 4, there is another cylinder 10R immediately behind the cylinder 10L, and for the thus rearwardly positioned cylinder 10R, there is provided the enlargement at the right end of such cylinder to provide space for the transfer passages 37R leading from the crankcase into the inlet ports of that cylinder, and for such rearwardly positioned cylinder 10R there is also provided an exhaust manifold 40R, portions of which are visible at the left of FIGURE 4. This manifold is also provided with a bolting flange 40RF. The angle between the locational lines 5–42 and 42–6 is the angle FA. It is preferred that this angle be not less than 90°, and preferably should be an angle of 90° to 180°. In FIGURES 1 and 2, for example, the angle would be 180°, or stated another way, the axis of each cylinder is a straight line and the locational planes are common. One reason why an angle much less than 90° is not preferred is because the movement of the scavenging gases through the cylinder becomes disturbed by a bend much sharper than 90°. Also, because of the bend in the cylinder, some shaping of the pistons may be necessary so as to avoid interference as they move towards each other. At the same time also, a somewhat larger space results near spark plug 52L, which, to some extent, reduces the compression ratio unless the pistons are shaped so as to occupy this space.

Therefore, while engines of the configuration as shown in FIGURE 4 may be used, and the invention may provide significant advantages, it is preferred that the angle FA be not less than 90°, and preferably should be between 90° and 180°. In most instances, the preferred construction is to have the axis of each cylinder a straight line, and to locate these axes contiguous and parallel as in FIGURES 1 and 2. The axis of one cylinder need not parallel the axis of the other cylinder. Thus, each cylinder may be bent at, for example, line 42—42 of FIGURE 2 at lines 250–251 of FIGURE 3, with the bends opposed as in FIGURE 5.

Figure 5:
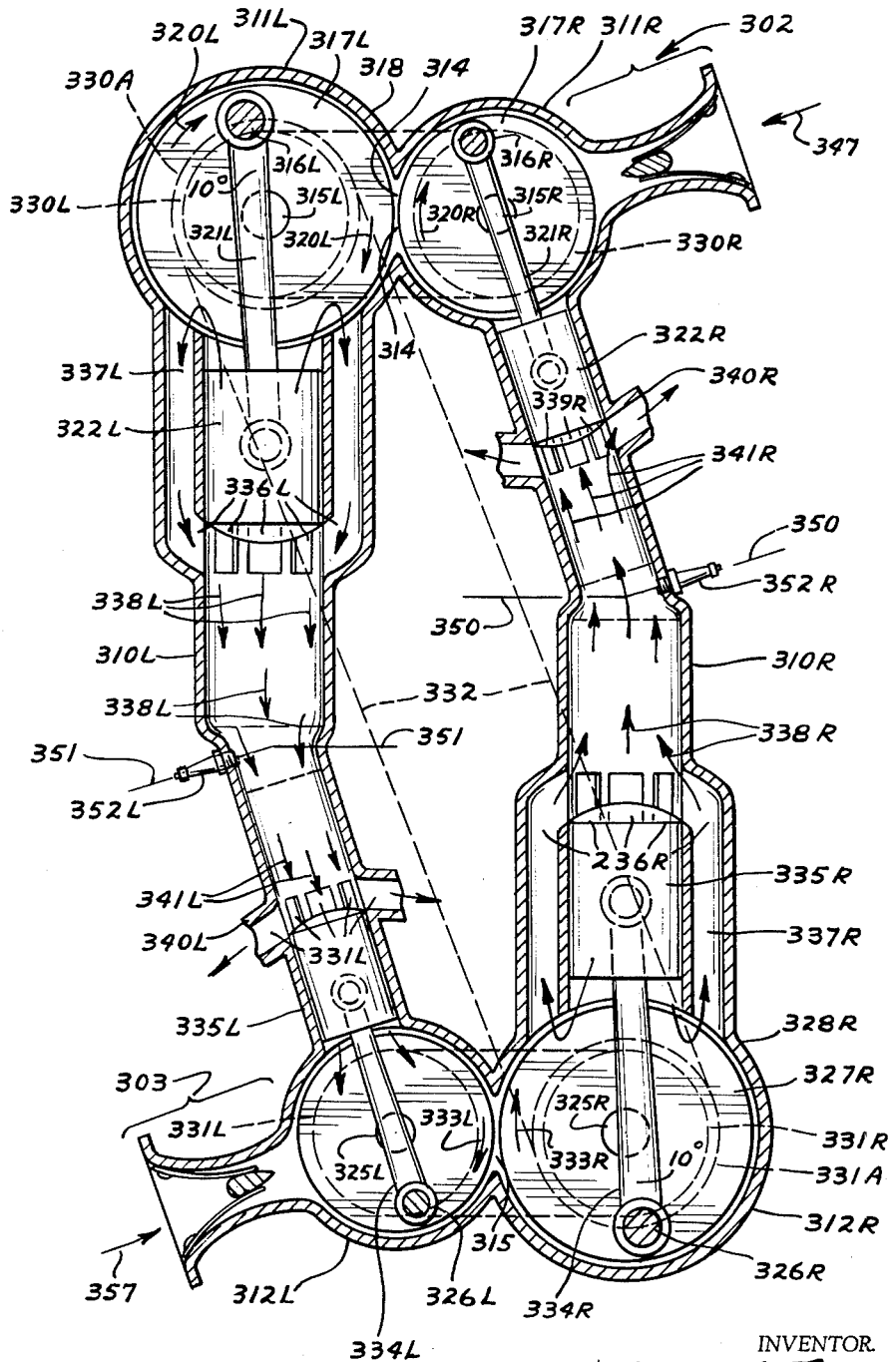
FIGURE 5 is a longitudinal sectional view, similar to FIGURE 3, showing another embodiment of the invention.

In FIGURE 5 there is illustrated a further embodiment of the invention wherein each of the cylinders is of a larger diameter at the intake end and a smaller diameter at the exhaust end, as in FIGURE 3, and in addition, the axis of each of the cylinders is bent slightly at the place where the diameter changes. The various parts in the engine are the same as those shown in FIGURE 3, with the exceptions mentioned below. In FIGURE 5, each of the numerals designating the various parts of the engine are numbered as in a "300" series, rather than the "200" series, as shown in FIGURE 3.

In FIGURE 3, the drive connection between the two cranks at one end of the cylinder is by means of gear teeth, such as teeth 218R—218L, between the discs 217R and 217L. In FIGURE 5, the connection is made by means of a chain belt or toothed belt.

Thus, in the engine shown in FIGURE 5, the crankshafts 315R and 315L are each provided with sprocket wheels 330R and 330L respectively, and these are connected together by a chain or toothed belt, so that the crankshafts are maintained at the same speeds and in the same relative angular positions, as they rotate. Similarly, the crankshafts 325R and 325L are likewise each provided with the same size of toothed sprockets 331R and 331L respectively, and these are likewise connected together by a chain belt or toothed belt. Accordingly, the crankshafts 325R and 325L are likewise maintained at the same speed and at the same angular relation in respect to each other. In order to maintain corresponding speed for the crankshafts at opposite ends of the engine, the crankshaft 315L (which may be an output shaft) is provided with another toothed sprocket 330A, and the crankshaft 325R is provided with a second toothed sprocket 331A which is the same diameter as the sprocket 330A, and these two sprockets are coupled together by means of a drive chain or a toothed belt 332, and accordingly, the two crankshafts 315L and 325R are maintained at the same speed and in the same angular relation to each other as they rotate.

It will be noted by use of this arrangement of sprockets and belts for coupling the four crankshafts 315R, 315L and 325R and 325L together, they all rotate in the same direction as shown by the arrows 320R, 320L, 333R and 333L, which is to say they all rotate in a clockwise direction, as shown in FIGURE 5. In this respect, the relative rotations of the crankshafts at the same ends of the cylinder in FIGURE 5 are opposite to that shown in FIGURE 3. This in entirely permissible in the engines of the present invention, since it is only the timed motions of the pistons themselves which must be maintained.

The construction shown in FIGURE 5, utilizing exterior drives for maintaining the timed rotation of the crankshafts, permits some reduction in the size of the crankcase around the crankshafts 315R and 325R, as compared to those shown in FIGURE 3. Another advantage of the engine shown in FIGURE 5 is that somewhat more space is provided between the cylinders for locating the exhaust manifolding and engine auxiliaries. Otherwise, the operation of the engine shown in FIGURE 5 corresponds to that shown in FIGURE 3. The bend in the axis of the cylinder at the point of change in diameter of the cylinders, i.e. at lines 350—350 for cylinder 310R and at lines 351—351 for cylinder 310L, does not materially disturb the uniflow character of the scavenging flow through the cylinders.

The change in the dimensions of the cylinders and pistons as shown in FIGURE 3 has the advantage that it, to some extent, shortens the overall length of the engine, as compared with an engine having the same bores in each end of the cylinder. This can be seen by comparing FIGURES 1 and 2.

In FIGURE 1, a poppet form of check valve induction port is shown at 44 and 48, whereas in FIGURES 2, 3 and 4 a form of reed valve induction port is illustrated at 202, 203, 102 and 103. Other forms of valving may also be used such as mechanically actuated poppet, rotary, piston or slide valves, as desired.

As many widely apparently different embodiments of this invention may be made without departing from the spirit and scope thereof, it is to be understood that I do not limit myself to the specific embodiments herein.

What I claim is:

1. A two-cycle internal combustion engine comprising first and second cylinders oriented so as to have their ends adjacent, crankcase means at each end of the adjacent cylinders, said crankcase means at said adjacent ends of the cylinders being common for both cylinders, intake valve means into each of said crankcase means, opposed pistons in each cylinder, crankshaft means and connecting rod means for each piston, all of said crankshaft means being mechanically connected so that the pistons of each cylinder predominantly move simultaneously toward and away from each other, the pistons cooperating with each of said crankcase means operating simultaneously to induct and compress the gases in such crankcase means, inlet and outlet ports in the wall of each cylinder positioned to cooperate with the pistons of said cylinders to open the ports as the pistons move far apart and to close said ports as they move together, the inlet and outlet ports of one of the cylinders being disposed at ends of the cylinder which are opposite to locations of the inlet and outlet ports respectively of the adjacent cylinder, the inlet ports of each cylinder being connected through a transfer passage to the crankcase means to which said ports are most adjacent.

2. The engine of claim 1 further characterized in that said cylinders have straight parallel axes.

3. The engine of claim 1 further characterized in that said cylinders are so oriented that the axes of adjacent ends of the cylinders are in a common plane of location and said plane of location at one end of the cylinders is disposed at an included angle to the other plane of location so included angle being from 90° to 180°.

4. The engine of claim 1 further characterized in that said crankshaft means for the pistons in adjacent ends of said cylinders have a common axis of rotation.

5. The engine of claim 1 further characterized in that said crankshaft means for the pistons in adjacent ends of said cylinders have separate axes of rotation.

6. The engine of claim 1 further characterized in that the cylinders each have a large diameter and a small diameter end, the large diameter end of one cylinder being adjacent the small diameter end of the other cylinder.

References Cited in the file of this patent
UNITED STATES PATENTS

| | | |
|---|---|---|
| 1,972,335 | Gardner | Sept. 4, 1934 |
| 1,972,409 | Petersen | Sept. 4, 1934 |
| 2,886,018 | Cuddon-Fletcher | May 12, 1959 |